(12) United States Patent
Sato

(10) Patent No.: US 8,891,821 B2
(45) Date of Patent: Nov. 18, 2014

(54) OBJECT TRACKING DEVICE, OBJECT TRACKING METHOD, AND OBJECT TRACKING PROGRAM

(75) Inventor: Yuji Sato, Tokyo (JP)

(73) Assignee: Panasonic Corporation, Osaka (JP)

( * ) Notice: Subject to any disclaimer, the term of this patent is extended or adjusted under 35 U.S.C. 154(b) by 426 days.

(21) Appl. No.: 13/263,169

(22) PCT Filed: Jan. 13, 2011

(86) PCT No.: PCT/JP2011/000135
§ 371 (c)(1),
(2), (4) Date: Dec. 8, 2011

(87) PCT Pub. No.: WO2011/102072
PCT Pub. Date: Aug. 25, 2011

(65) Prior Publication Data
US 2012/0093364 A1   Apr. 19, 2012

(30) Foreign Application Priority Data
Feb. 19, 2010   (JP) .................................. 2010-034849

(51) Int. Cl.
*G06K 9/00*   (2006.01)
*G06T 7/20*   (2006.01)

(52) U.S. Cl.
CPC ....... *G06T 7/208* (2013.01); *G06T 2207/10016* (2013.01); *G06T 2207/20076* (2013.01)
USPC .......................................... 382/103; 382/104

(58) Field of Classification Search
CPC ..................... G06T 7/208; G06T 2207/10016; G06T 2207/20076
USPC ........... 382/100, 103–104; 345/169; 348/135; 702/181, 150; 703/6
See application file for complete search history.

(56) References Cited

U.S. PATENT DOCUMENTS 8,010,314 B2 * 8/2011 Spiesberger .................. 702/150
8,223,207 B2   7/2012 Baba et al.
(Continued)

FOREIGN PATENT DOCUMENTS

CN   101515995   8/2009
JP   2009-87090   4/2009
(Continued)

OTHER PUBLICATIONS

China Office Action, dated Jan. 13, 2014 along with an English translation thereof.
(Continued)

*Primary Examiner* — Hadi Akhavannik
*Assistant Examiner* — Mehdi Rashidian
(74) *Attorney, Agent, or Firm* — Greenblum & Bernstein, P.L.C.

(57) ABSTRACT

An object tracking apparatus is provided that enables the possibility of erroneous tracking to be further reduced. An object tracking apparatus (300) is an apparatus that tracks the position of an object displayed in video using a particle filter, and has: a feature calculation section (340) that generates a plurality of particles indicating candidates for the position of the object, and calculates a feature of an image of the object and features of images of the particles; a likelihood calculation section (350) that calculates, for each particle, the likelihood of that particle being the position of the object from similarity between a feature of an image of that particle and a feature of an image of the object; a position estimation section (360) that estimates the position of the object based on the calculated particle likelihood; and a likelihood correction section (390) that performs likelihood correction when there are a plurality of objects and a plurality of positions estimated in correspondence to these overlap.

8 Claims, 6 Drawing Sheets

(56) References Cited

U.S. PATENT DOCUMENTS

| | | | |
|---|---|---|---|
| 8,311,773 B2* | 11/2012 | Spiesberger | 702/181 |
| 2006/0252475 A1* | 11/2006 | Zalewski et al. | 463/1 |
| 2009/0175500 A1* | 7/2009 | Kizuki et al. | 382/103 |
| 2009/0213222 A1* | 8/2009 | Baba et al. | 348/169 |
| 2010/0002908 A1 | 1/2010 | Miyamoto et al. | |
| 2010/0150401 A1* | 6/2010 | Kizuki et al. | 382/103 |
| 2010/0226538 A1* | 9/2010 | Yashiro et al. | 382/103 |
| 2010/0296697 A1* | 11/2010 | Ikenoue | 382/103 |
| 2011/0058708 A1* | 3/2011 | Ikenoue | 382/103 |
| 2011/0221890 A1* | 9/2011 | Yamashita | 348/135 |
| 2012/0020518 A1* | 1/2012 | Taguchi | 382/103 |

FOREIGN PATENT DOCUMENTS

| | | |
|---|---|---|
| JP | 2010-219934 | 9/2010 |
| WO | 2008/007471 | 1/2008 |

OTHER PUBLICATIONS

Isard et al., "Condensation—Conditional Density Propagation for Visual Tracking", Kluwer Academic Publishers International Journal of Computer Vision 29(1), 1998, pp. 5-28.

* cited by examiner

OBJECT TRACKING DEVICE, OBJECT TRACKING METHOD, AND OBJECT TRACKING PROGRAM

TECHNICAL FIELD

The present invention relates to an object tracking apparatus, object tracking method, and object tracking program that track the position of an object displayed in video using a particle filter.

BACKGROUND ART

Conventionally, tracking of the position of a physical object such as a person displayed in video has been performed using a particle filter (see Patent Literature 1 and Non-Patent Literature 1, for example).

In the technology described in Patent Literature 1 and the technology described in Non-Patent Literature 1 (hereinafter referred to collectively as "the conventional technology"), a feature of an image of an object in video is first found. In the conventional technology, a plurality of particles indicating candidates for the position of an object at time t following the position of the object at time t-1 are generated, and feature mapping is performed between each time t particle and a time t-1 object position. Then, in the conventional technology, the likelihood of each particle being the time t object position is calculated from the corresponding similarity. Then, in the conventional technology, the position of the particle with the highest likelihood is estimated as the object position at time t for each object. By this means, the conventional technology enables the position of the same object to be tracked continuously.

Also, in the technology described in Patent Literature 1, in particular, an above likelihood is corrected using a color feature when a feature is a shape feature indicating a contour curve of an object. Specifically, in the technology described in Patent Literature 1, a color feature that is a color histogram of an area within a contour curve, for example, is first calculated for each particle. Then, in the technology described in Patent Literature 1, similarity between an object color feature color histogram and a color histogram of each particle is calculated by means of histogram intersection. Following this, the technology described in Patent Literature 1 corrects an above likelihood based on a calculation result. By this means, with the technology described in Patent Literature 1, even if a different object with a similar contour curve is positioned in the vicinity of a target object, the possibility of that different object being tracked by mistake can be reduced.

CITATION LIST

Patent Literature

PTL 1
Japanese Patent Application Laid-Open No. 2009-87090

Non-Patent Literature

NPL 1
M. Isard and A. Blake, "Condensation—Conditional Density Propagation for Visual Tracking", International Journal of Computer Vision, vol. 29, no. 1, pp. 5-28, 1998

SUMMARY OF INVENTION

Technical Problem

However, with the conventional technology, object discrimination is difficult, for example, when objects have similar image features, such as when a plurality of workers wearing work clothing of the same color are objects in a factory. Therefore, with the conventional technology, the possibility of a different object being tracked by mistake (hereinafter referred to as "erroneous tracking") cannot be sufficiently reduced.

It is therefore an object of the present invention to provide an object tracking apparatus, object tracking method, and object tracking program that enable the possibility of erroneous tracking to be further reduced.

Solution to Problem

An object tracking apparatus of the present invention tracks the position of an object displayed in video using a particle filter, and has: a feature calculation section that generates a plurality of particles indicating candidates for the position of the object, and calculates a feature of an image of the object and features of images of the particles; a likelihood calculation section that calculates, for each particle, the likelihood of that particle being the position of the object from similarity between a feature of an image of that particle and a feature of an image of the object; a position estimation section that estimates the position of the object based on the calculated particle likelihood; and a likelihood correction section that corrects the likelihood when there are a plurality of objects and a plurality of positions estimated in correspondence to these overlap.

An object tracking method of the present invention tracks the position of an object displayed in video using a particle filter, and has the steps of: generating a plurality of particles indicating candidates for the position of the object, and calculating a feature of an image of the object and features of images of the particles; calculating, for each particle, the likelihood of that particle being the position of the object from similarity between a feature of an image of that particle and a feature of an image of the object; estimating the position of the object based on the calculated particle likelihood; and correcting the likelihood when there are a plurality of objects and a plurality of positions estimated in correspondence to these overlap.

An object tracking program of the present invention is a program for tracking the position of an object displayed in video using a particle filter, and causes a computer to execute: processing that generates a plurality of particles indicating candidates for the position of the object, and calculates a feature of an image of the object and features of images of the particles; processing that calculates, for each particle, the likelihood of that particle being the position of the object from similarity between a feature of an image of that particle and a feature of an image of the object; processing that estimates the position of the object based on the calculated particle likelihood; and processing that corrects the likelihood when there are a plurality of objects and a plurality of positions estimated in correspondence to these overlap.

Advantageous Effects of Invention

The present invention enables particle likelihoods to be corrected when estimated positions of objects overlap, and enables the possibility of erroneous tracking to be further reduced.

DESCRIPTION OF EMBODIMENT

Now, an embodiment of the present invention will be described in detail with reference to the accompanying drawings.

Figure 1:
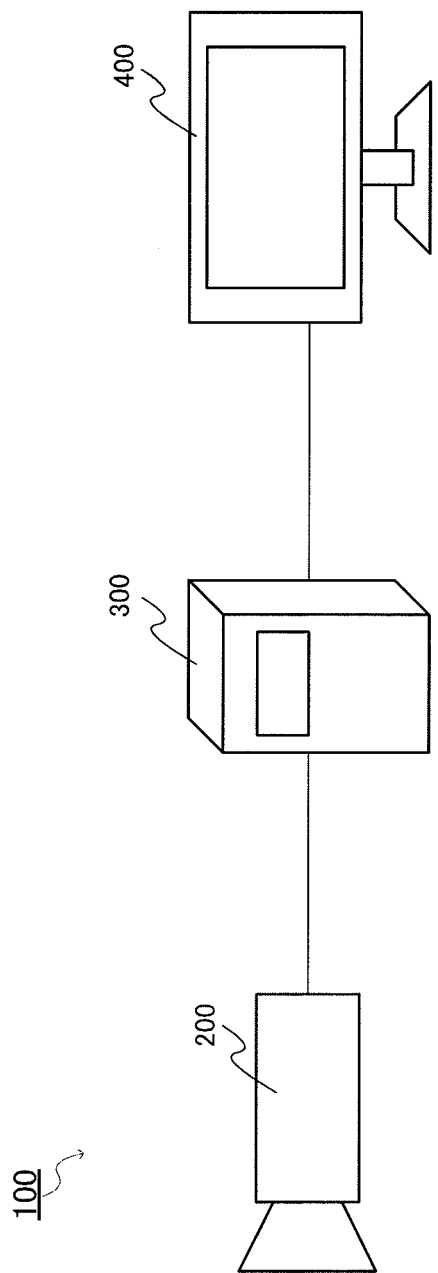
FIG. 1 is a system configuration diagram showing the configuration of an object tracking system that includes an object tracking apparatus according to an embodiment of the present invention.

FIG. 1 is a system configuration diagram showing the configuration of an object tracking system that includes an object tracking apparatus according to an embodiment of the present invention. This embodiment describes an example in which the present invention is applied to a system that tracks the movements of a plurality of workers wearing the same work clothing in a factory in captured video.

In FIG. 1, object tracking system 100 has imaging apparatus 200, object tracking apparatus 300, and display apparatus 400. Imaging apparatus 200 and display apparatus 400 are connected to object tracking apparatus 300 so as to be able to communicate therewith.

Imaging apparatus 200 is a device provided with an image acquisition function, such as a digital video camera, for example. Imaging apparatus 200, for example, photographs the situation within a factory, and outputs captured image time series data (captured video) to object tracking apparatus 300.

Object tracking apparatus 300 is a device provided with an object tracking function, such as a personal computer, for example. Object tracking apparatus 300 uses a particle filter to track a position of an object in an image (hereinafter referred to simply as "position") from captured video input from imaging apparatus 200 (see Patent Literature 1 and Non-Patent Literature 1, for example). Among particles used in object position estimation, object tracking apparatus 300 lowers the likelihood of a particle that overlaps the position of another object. Then object tracking apparatus 300 generates an image in which tracking results are visually superimposed on captured video (hereinafter referred to as a "result display image"), and outputs this result display image to display apparatus 400.

Display apparatus 400 is a device provided with a function for displaying an image, such as a liquid crystal display, for example. Display apparatus 400 displays an image (result display image) input from object tracking apparatus 300 on its screen.

Object tracking apparatus 300 configured in this way can reduce erroneous tracking even if there are objects with similar image features.

The reason object tracking apparatus 300 can reduce erroneous tracking will be briefly explained here, together with an outline of a particle filter.

A particle filter is bayesian filtering approximate calculation method. A probability distribution of an object position at time t can be obtained by applying position prediction, likelihood observation, and resampling to a position detected at time t-1. Here, position prediction is prediction of a position at time t based on a state transition model. Likelihood observation is finding the likelihood of each position based on the similarity of a feature of an image of an object to a feature of a reference image. Resampling is picking up a value resulting from discretization of a probability density distribution of the positions. A reference image is an image registered as a tracking object, and is, for example, an image of an object being tracked acquired in the past. Object tracking apparatus 300 performs detection of an object from captured video periodically by means of image processing.

Figure 2:
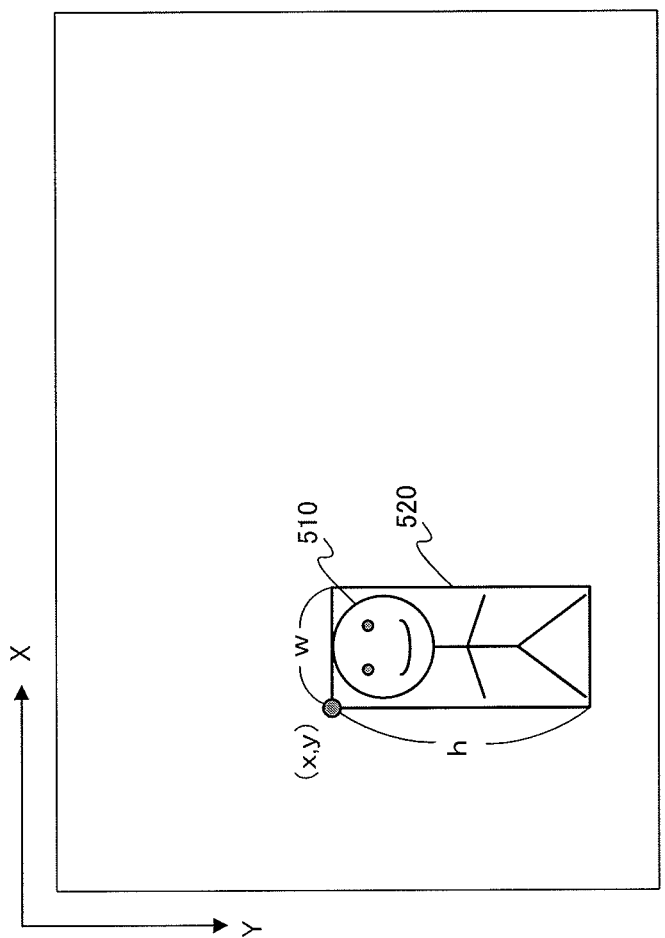
FIG. 2 is a drawing showing definition of a position of an object in this embodiment.

FIG. 2 is a drawing showing definition of a position of an object in this embodiment. As shown in FIG. 2, object tracking apparatus 300 acquires information that defines the position of detected object 510 using XY-axes set on an image surface. Information that defines the position of object 510 is a parameter set that includes upper-left coordinates (x, y), width w, and height h, of rectangular frame 520 that circumscribes object 510, for example. Object 510 may be the entire body of a worker, or may be a part of a worker, such as the upper body.

Figure 3:
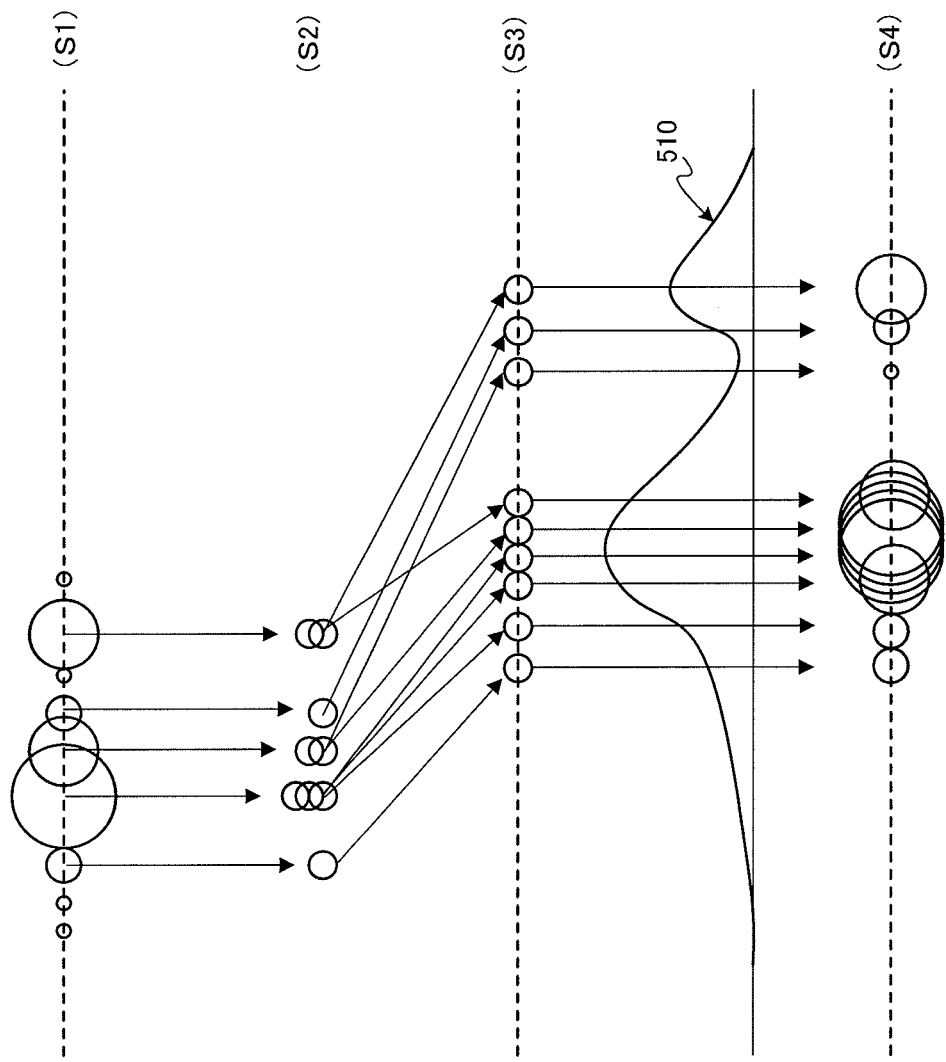
FIG. 3 is a drawing for explaining tracking using a particle filter in this embodiment.

FIG. 3 is a drawing for explaining an outline of tracking using a particle filter. In FIG. 3, the horizontal axis indicates positions conceptually.

As shown in FIG. 3, in each period in which an object position is detected, object tracking apparatus 300 generates particles that substantialize a probability density distribution of each position at an object position that is a detection result at time t-1 of the previous period (S2). An average position of a probability density distribution approximated by particles generated here is a position that has a high probability of being the actual position of an object at time t.

Then object tracking apparatus 300 moves each particle using a state transition model (S3). The density of particles moved here represents discretely the true probability density distribution at time t of the next period (represented by line 510). That is to say, an average position of density of particles after movement is a position that has a high possibility of being the actual position of an object at time t. For each post-movement particle, object tracking apparatus 300 calculates similarity to an image registered as a tracking object as a likelihood (S4). Then object tracking apparatus 300 estimates a weighted average position of a probability distribution calculated based on the likelihood of each particle as an object position at time t.

However, as previously stated, with the conventional technology there is a high possibility of erroneous tracking occurring when objects are close in video. Thus, object tracking apparatus 300 according to this embodiment performs particle likelihood correction when there are a plurality of particles and a plurality of positions estimated in correspondence to these overlap. Specifically, when the size of an overlap area of a particle of a second object with respect to a position of a first object is greater than or equal to a first predetermined value, object tracking apparatus 300 lowers the likelihood of a corresponding particle. By this means, object tracking apparatus 300 can reduce the possibility of tracking being drawn to an image of another object and erroneous tracking occurring.

Object tracking apparatus 300 takes a case in which object positions are actually displayed overlapping into consideration, and utilizing the fact that likelihood is not very high in such a case, limits likelihood correction to a case in which likelihood is greater than or equal to a second predetermined value. By this means, object tracking apparatus 300 can prevent likelihood falling and position detection becoming impossible even though object positions are actually displayed overlapping.

The configuration of object tracking apparatus 300 will now be described.

Figure 4:
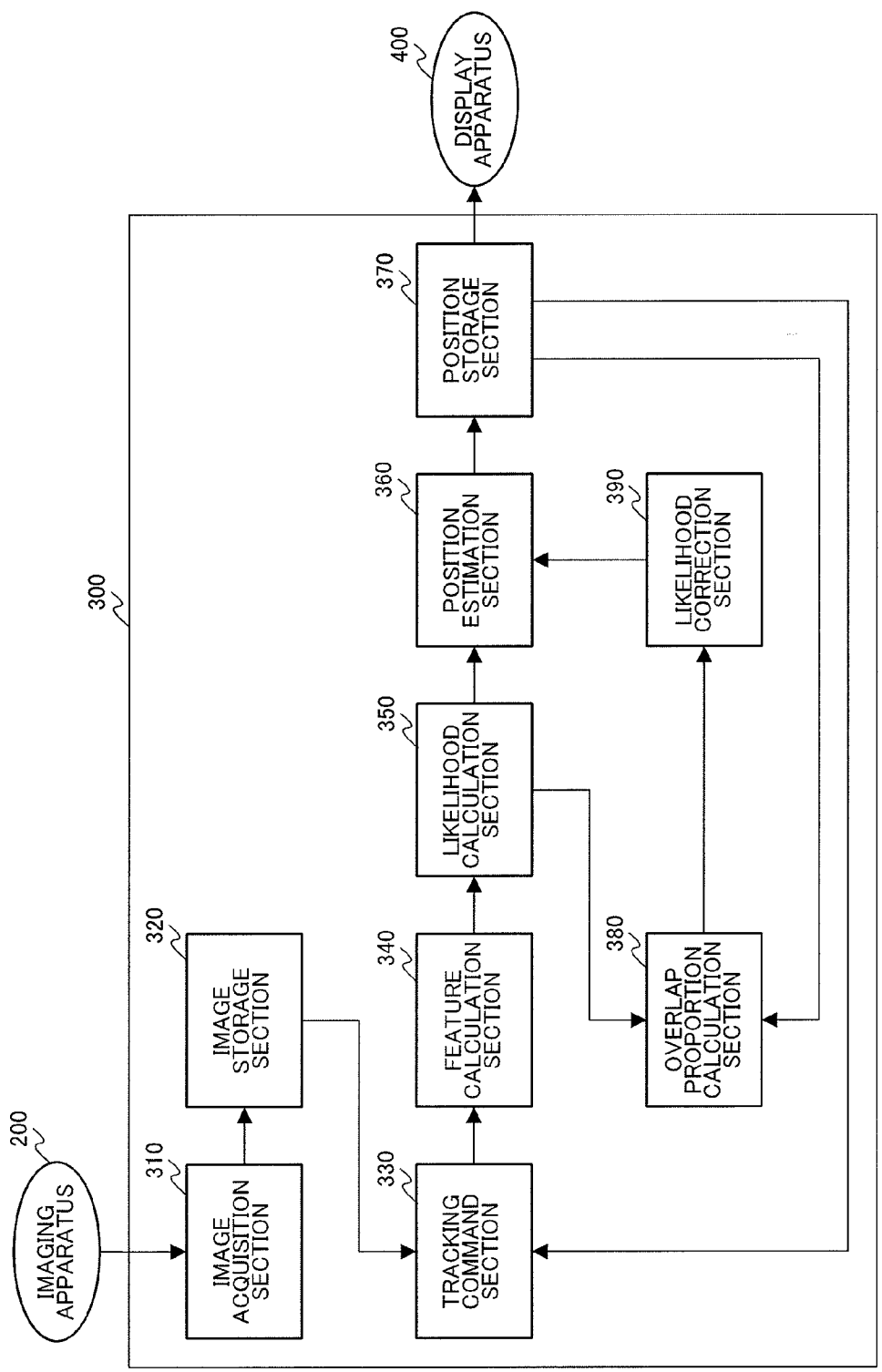
FIG. 4 is a block diagram showing the configuration of an object tracking apparatus according to this embodiment.

FIG. 4 is a block diagram showing the configuration of object tracking apparatus 300.

In FIG. 4, object tracking apparatus 300 has image acquisition section 310, image storage section 320, tracking command section 330, feature calculation section 340, likelihood calculation section 350, position estimation section 360, position storage section 370, overlap proportion calculation section 380, and likelihood correction section 390.

Image acquisition section 310 acquires an image from imaging apparatus 200, and outputs that image to image storage section 320.

Image storage section 320 stores an image input from image acquisition section 310.

Tracking command section 330 acquires an image from image storage section 320, and detects a moving object from the image by applying a background subtraction technique, for example. Here, moving objects displayed in an image are assumed to be workers only. Therefore, tracking command section 330 detects an object from an image.

Also, for each object, tracking command section 330 determines whether the object corresponds to a newly detected object or an object that is being tracked. A newly detected object denotes an object that has started to move, or an object that has entered the screen. An object that is being tracked denotes an object whose position at the immediately preceding time has been detected. Details of this determination will be given later herein. Below, a newly detected object is referred to as a "new object," and an object that is being tracked is referred to as an "object being tracked."

Tracking command section 330 outputs an image, and position information of each detected object, to feature calculation section 340. Position information includes an object position, and a status flag indicating whether an object is a new object or an object being tracked (hereinafter referred to as "tracking status"). Here, an object position is assumed to include upper-left coordinates (x,y), width w, and height h, of rectangular frame 520 that circumscribes an object. Also, for an object being tracked, tracking command section 330 outputs a reference histogram registered by feature calculation section 340 described later herein to feature calculation section 340, associated with that object being tracked. A reference histogram will be described later herein.

Feature calculation section 340 acquires the position and tracking status of each object from input position information.

Then, for a new object, feature calculation section 340 registers that image as a tracking object. Specifically, feature calculation section 340 calculates a color histogram of an image area of a new object position (hereinafter referred to as "reference histogram"), and changes the status flag to "object being tracked." Then feature calculation section 340 outputs an image, and position information and a reference histogram of an object newly registered as a tracking object, to likelihood calculation section 350. Position information and a reference histogram of an object newly registered as a tracking object thus comprise initial registration information of an object being tracked.

Also, for an object being tracked, feature calculation section 340 executes particle resampling, position prediction, and likelihood observation, around the relevant position, based on a particle filter method. Specifically, feature calculation section 340 first prioritizes high-likelihood particles around the position of an object being tracked, and resamples a predetermined number of particles (for example, 200) (S1 and S2 in FIG. 3).

Then feature calculation section 340 causes a transition of resampled particles based on a state transition model (S3 in FIG. 3). For example, feature calculation section 340 uses a state transition model whereby transition is performed to a position that takes account of an amount of movement per unit time and Gaussian noise on the assumption that an object performs linear uniform motion. Then feature calculation section 340 outputs an image, and position information, a reference histogram, and particle information of each object being tracked, to likelihood calculation section 350. Particle information is information that defines each generated particle, and is a parameter set indicating the position of each particle—that is, the upper-left coordinates, width, and height, of a rectangular frame that defines a particle (see FIG. 2).

Likelihood calculation section 350 outputs an input image and reference histogram of each object to position estimation section 360. Also, when particle information is input, likelihood calculation section 350 calculates likelihood for each particle from the particle information by means of a particle filter. Specifically, likelihood calculation section 350 calculates a color histogram for each particle. Then likelihood calculation section 350 calculates similarity between a calculation result and reference histogram by means of histogram intersection, and takes the calculation result as the likelihood of that particle being the position of an object being tracked. Likelihood calculation section 350 then outputs position information of each object, and the particle information and likelihood of each particle, to overlap proportion calculation section 380.

Overlap proportion calculation section 380 detects a proportion of overlap with another object for each particle of an object being tracked. A proportion of overlap (overlap proportion) is, for example, a proportion of the area of an overlapping area with respect to the area of a particle. Then overlap proportion calculation section 380 outputs position information of each object, and the particle information, likelihood, and overlap proportion of each particle, to likelihood correction section 390.

When there are a plurality of objects being tracked, and a plurality of positions estimated in correspondence to these by position estimation section 360 overlap, likelihood correction section 390 performs particle likelihood correction. Specifically, likelihood correction section 390 lowers the likelihood of a particle for which the overlap proportion is greater than or equal to a first predetermined value and the likelihood is greater than or equal to a second predetermined value. Then likelihood correction section 390 outputs position information of each object, and the particle information and likelihood of each particle, to position estimation section 360.

For each object being tracked, position estimation section 360 calculates an average position of a probability distribution weighted by the likelihood of each particle after movement. Next, position estimation section 360 calculates the total value of the likelihoods of the particles (hereinafter referred to as "likelihood total value"). Then position estimation section 360 estimates a calculated position as a position at time t of that object being tracked, and outputs the estimated position, the likelihood total value thereof, and N items of particle information described later herein, to position storage section 370.

Position storage section 370 stores the input position at time t of each object being tracked, the likelihood total value thereof, and N items of particle information. A position of each object being tracked stored by position storage section 370 is referenced by above tracking command section 330 and overlap proportion calculation section 380. Position storage section 370 also stores time series data of a stored series of positions and a captured image associated with a time, generates a result display screen with a position of an object being tracked visually superimposed on a captured image as a tracking result, and outputs this result display screen to display apparatus 400.

Object tracking apparatus 300 having such a configuration can perform position estimation by lowering the likelihood of a particle greatly overlapping another object position among particles used in object position estimation.

The operation of object tracking apparatus 300 will now be described.

Figure 5:
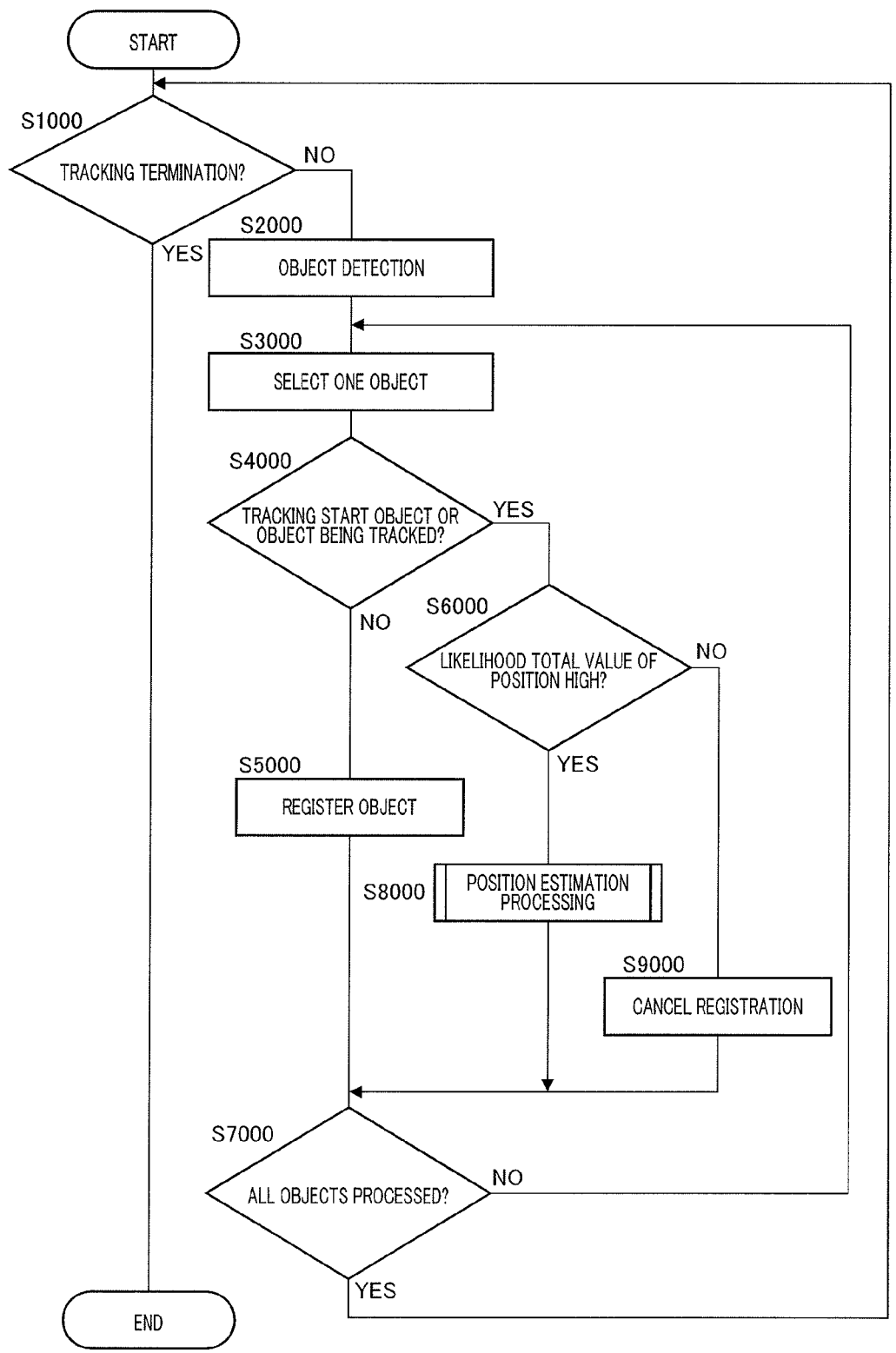
FIG. 5 is a flowchart showing the overall operation of an object tracking apparatus according to this embodiment.

FIG. 5 is a flowchart showing the overall operation of object tracking apparatus 300.

It is assumed that captured video sent from imaging apparatus 200 is stored in image storage section 320 of object tracking apparatus 300.

First, in step S1000, tracking command section 330 determines whether or not termination of tracking processing has been commanded by means of a user operation (such as depression of a program termination button by a system administrator) or the like. If termination of tracking processing has been commanded (S1000: YES), tracking command section 330 terminates processing directly. If termination of tracking processing has not been commanded (S1000: NO), tracking command section 330 proceeds to step S2000.

In step S2000, tracking command section 330 detects an object from a time t-1 image stored in image storage section 320, and generates position information for each object. Specifically, for example, tracking command section 330 takes an image acquired upon startup of object tracking system 100 as a background image, and generates a difference image by means of a background subtraction technique. Then tracking command section 330 detects an area having a size, shape, or suchlike image feature estimated as an object in a difference image as an object image area, and defines the position thereof. Tracking command section 330 then performs tracking status determination for each detected object, and associates a status flag therewith.

Then, in step S3000, tracking command section 330 selects one of the objects detected from a time t-1 image.

Then, in step S4000, tracking command section 330 determines whether or not the selected object is an object for which tracking has been started (hereinafter referred to as "tracking start object") or an object being tracked.

This determination is performed, for example, based on whether or not there is a position for which a degree of matching is greater than or equal to a given value among positions of tracking start objects or objects being tracked at time t-1 stored in position storage section 370 described later herein. At this time, tracking command section 330 may calculate a direction of movement of an object being tracked from a plurality of past items of position information. Then, in this case, provision may be made for tracking command section 330 to calculate an overlap proportion for a position resulting from moving a time t-1 position by an amount of movement and in a direction of movement when an object being tracked is assumed to perform linear uniform motion.

If the selected object is not a tracking start object or an object being tracked—that is, if the selected object is a new object—(S4000: NO), tracking command section 330 proceeds to step S5000. If the selected object is a tracking start object or an object being tracked (S4000: YES), tracking command section 330 proceeds to step S8000.

In step S5000, feature calculation section 340 registers the selected object as a tracking object. That is to say, feature calculation section 340 generates a new object reference histogram and includes this in position information, and also amends the corresponding status flag to contents indicating that the object is a tracking start object.

Then, in step S7000, feature calculation section 340 determines whether or not step S4000 processing has been performed on all the objects detected from a time t-1 image. If all the objects have been processed (S7000: YES), feature calculation section 340 returns to step S1000. If objects that have not been processed remain (S7000: NO), feature calculation section 340 returns to step S3000 and selects an unprocessed object.

In step S6000, tracking command section 330 determines whether or not the likelihood total value of position information of the selected object is high. If the selected object is an object being tracked and the above likelihood total value is greater than or equal to a third predetermined value, the likelihood total value is determined to be sufficiently high for tracking to be continued. If the selected object is an object being tracked and a likelihood average value described later herein is less than the third predetermined value, the likelihood total value is determined to be too low for tracking to be continued. If the likelihood total value is high (S6000: YES), tracking command section 330 proceeds to step S8000. If the likelihood total value is low (S6000: NO), tracking command section 330 proceeds to step S9000.

In step S8000, object tracking apparatus 300 performs position estimation processing, and proceeds to step S7000. Position estimation processing will be described later herein.

In step S9000, tracking command section 330, determining that continuation of tracking is difficult, cancels registration of the selected object as a tracking object, and proceeds to step S7000. That is to say, tracking command section 330 discards position information of the selected object.

Figure 6:
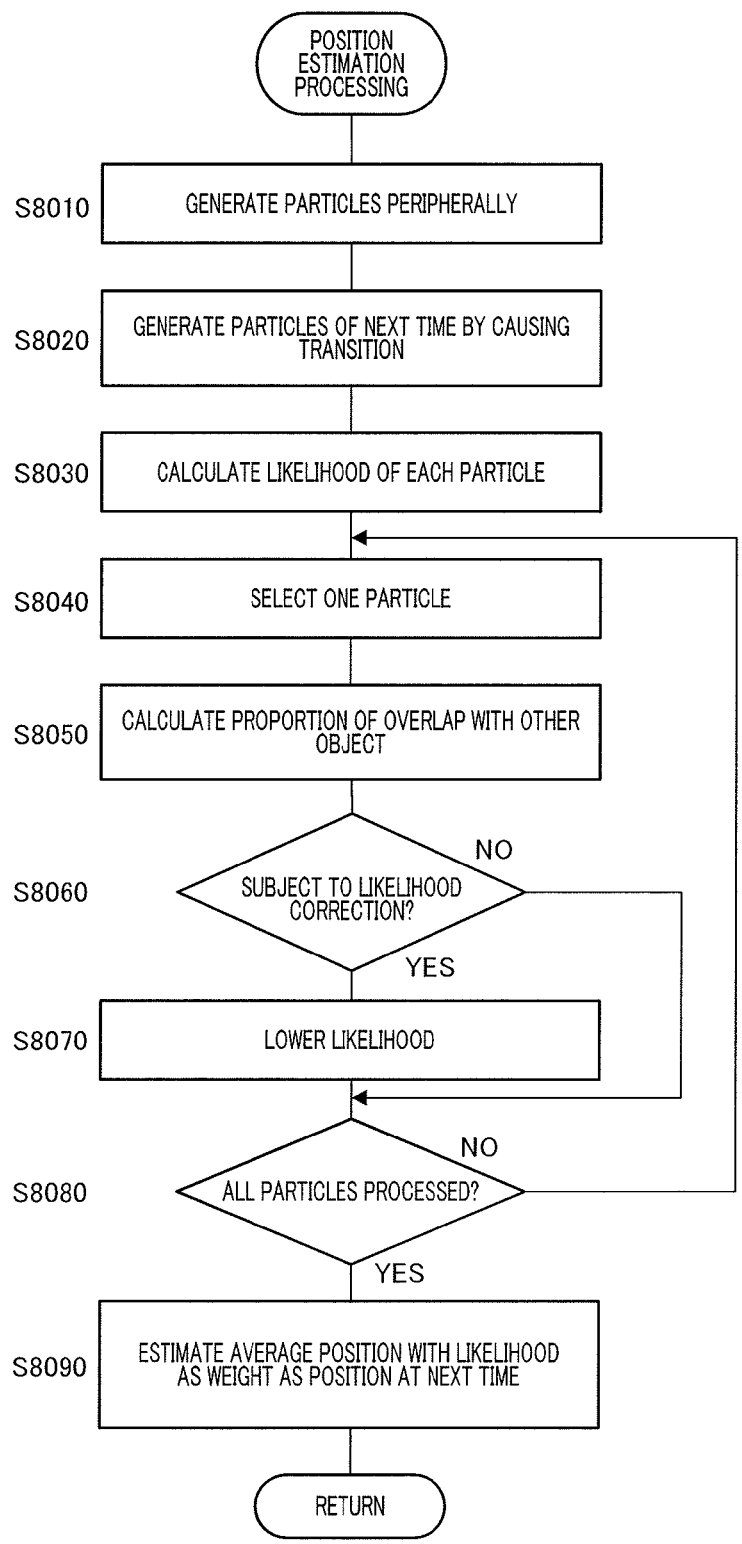
FIG. 6 is a flowchart showing position estimation processing in this embodiment.

Position estimation processing will now be described, using the flowchart shown in FIG. 6.

First, in step S8010, feature calculation section 340 generates and positions particles that are candidates for the position of an actual time t object being tracked around the position of an object being tracked. At this time, if a selected object is a tracking start object, feature calculation section 340 positions N particles randomly. On the other hand, if a selected object is an object being tracked, feature calculation section 340 allows particle duplication and selects (resamples) N particles from among time t-1 particles. Then feature calculation section 340 discards particles that are not selected. It is desirable for feature calculation section 340 to select more high-likelihood particles. For example, provision may be made for feature calculation section 340 to repeatedly select a number of values obtained by multiplying the likelihood of an i'th particle by N in descending order of likelihood until N is reached.

Then, in step S8020, feature calculation section 340 moves each of the N particles based on a state transition model, and generates particles of following time t. A state transition model has contents, for example, whereby, on the assumption of linear uniform motion, amount of movement d and Gaussian noise n of a given time are added, and an i'th particle positioned at coordinates $(x_1, y_1)$ is moved to $(x_1+d_x+n_{i,x}, y_1+d_y+n_{i,y})$.

Then, in step S8030, likelihood calculation section 350 calculates a histogram intersection with respect to a corresponding reference histogram as likelihood L of each post-movement particle. A histogram intersection is a value when the smaller of frequency $a_c$ of reference histogram color value c and frequency $b_c$ of particle histogram color value c are totaled for all color values.

Then, in step S8040, overlap proportion calculation section 380 selects one of the particles of the selected object being tracked.

Then, in step S8050, overlap proportion calculation section 380 uses equation 1 below, for example, to calculate, for each other object, overlap proportion Cr of a selected particle with respect to the other object. Here, Pa is the area of a selected particle, and B is the area of an overlapping part between a selected particle and another object area (an area of a rectangular frame circumscribing an object: see FIG. 2).

$$Cr = B/Pa \quad \text{(Equation 1)}$$

If there are a plurality of objects, overlap proportion calculation section 380 uses the largest overlap proportion as a final computation result. Overlap proportion calculation section 380 may acquire a position of another object from position storage section 370, or from position information input from likelihood calculation section 350.

Then, in step S8060, likelihood correction section 390 determines whether or not the selected particle is subject to likelihood correction. If the overlap proportion is greater than or equal to a first predetermined value and likelihood is greater than or equal to a second predetermined value, likelihood correction section 390 determines the particle to be subject to likelihood correction. Other particles are determined not to be subject to likelihood correction.

The second predetermined value is, for example, a likelihood histogram mode, or likelihood average value, of N particles of a selected object being tracked. When a mode is used as the second predetermined value, it is easy to lower only a likelihood that has become high due to the influence of another object, and therefore an outlier tends to have little influence. Therefore, this has the advantage of being effective when particles are positioned uniformly around an object being tracked, for example. When an average value is used as the second predetermined value, it is not necessary to prepare a second predetermined value beforehand, which is advantageous in terms of simplicity of calculation.

If a selected particle is subject to likelihood correction (S8060: YES), likelihood correction section 390 proceeds to step S8070. If a selected particle is not subject to likelihood correction (S8060: NO), likelihood correction section 390 proceeds to step S8080.

In step S8070, likelihood correction section 390 lowers the likelihood of the selected particle. Specifically, likelihood correction section 390 finds a post-correction likelihood value by means of a predetermined method. A variety of particle likelihood correction methods can be used.

For example, likelihood correction section 390 finds a likelihood difference with respect to the above second predetermined value, and uses a previously found correction value associated with a combination of overlap proportion and difference.

Alternatively, likelihood correction section 390 finds a likelihood difference with respect to a particle likelihood average value of a selected object being tracked, and uses a previously found correction value associated with a combination of overlap proportion and difference.

Alternatively, likelihood correction section 390 finds a likelihood difference with respect to a mode of a likelihood histogram of a selected particle, and uses a previously found correction value associated with a combination of overlap proportion and difference.

Alternatively, likelihood correction section 390 uses equation 2 below, for example, to calculate post-correction likelihood La' from original likelihood La and overlap proportion Cr.

$$La' = La \times (1 - Cr) \quad \text{(Equation 2)}$$

Then, in step S8080, likelihood correction section 390 determines whether or not step S8060 processing has been performed for all the particles of a selected tracking start object or object being tracked. If all the particles have been processed (S8080: YES), likelihood correction section 390 proceeds to step S8090. If particles that have not been processed remain (S8080: NO), likelihood correction section 390 returns to step S8040 and selects an unprocessed particle. By repeating the processing in steps S8040 through S8080, likelihood correction section 390 can lower the likelihood of particles that have been drawn to another object and whose likelihood has become high.

Then, in step S8090, position estimation section 360 finds a weighted average for particle positions for N particles, with the likelihood of each particle as a weight, and estimates the found value as a position at following time t. That is to say, position estimation section 360 updates time t-1 position information stored in position storage section 370 with the found value. As a result, position storage section 370 displays a result display screen with a tracking result of an object being tracked superimposed on captured video, using display apparatus 400.

In the case of an object being tracked, position estimation section 360 amends the status flag to contents indicating an object being tracked. Then position estimation section 360 stores a reference histogram of the selected object being tracked in position storage section 370. Position estimation section 360 also stores a likelihood total value of N particles of the selected object being tracked in position storage section 370. If this likelihood total value is low, there is a high possibility of a tracking result being erroneous, and therefore the result should not be displayed. Therefore, as described above, if a likelihood total value is less than a third predetermined value, object tracking apparatus 300 terminates tracking for the corresponding object being tracked (see steps S6000 and S9000 in FIG. 5).

By means of such processing, object tracking apparatus 300 can track the position of an object using a particle filter, and perform particle likelihood correction when tracking positions of a plurality of objects overlap. The processing flow from step S1000 through step S5000 can be called operation in the case of initialization of tracking processing for a certain object. The processing flow from step S1000 through step S8000 can be called operation in the case of the start of tracking processing and continuation of tracking processing for a certain object, and the processing flow from step S1000 through step S9000 can be called operation in the case of termination of tracking processing for a certain object.

An example has been described in which processing is performed by each section in turn for each object and for each particle, but object tracking apparatus 300 may also perform the above processing operations collectively for a plurality of objects or a plurality of particles.

As described above, object tracking apparatus 300 according to this embodiment tracks the position of an object using a particle filter, and performs particle likelihood correction when tracking positions of a plurality of objects overlap. By this means, if image features of a plurality of objects are similar, whereas with the conventional technology there is a possibility of tracking being drawn to an image of another object and erroneous tracking occurring, object tracking apparatus 300 can reduce such a possibility.

In the above-described embodiment, provision may be made for object tracking apparatus 300 to be provided with a proximity state determination section, before likelihood correction section 390, that determines a proximity state for each particle based on an overlap proportion thereof.

In this case, for example, the proximity state determination section determines that a relevant particle is in a proximity state if the overlap proportion is greater than or equal to a fourth predetermined value, and determines that a relevant particle is not in a proximity state if the overlap proportion is less than a fourth predetermined value. The fourth predetermined value is, for example, an average value of proportions of overlap of all particles of an object with respect to another object. Alternatively, the fourth predetermined value is a mode of a histogram of proportions of overlap of all particles of an object with respect to another object. Then object tracking apparatus 300 performs determination of whether or not a particle is subject to likelihood correction only for a particle determined to be in a proximity state.

By performing such proximity state determination, the proximity state determination section can determine that a particle is not subject to likelihood correction even if that particle is one for which overlapping occurs. Therefore, object tracking apparatus 300 can reduce erroneous tracking due to excessive lowering of likelihood.

Taking into consideration changes in size in an image due to the movement of an object, object tracking apparatus 300 may scale the width and height of a particle according to the movement of an object.

For example, consider an environment in which imaging apparatus 200 performs imaging so as to look down at the floor. If the Y-coordinate value of a particle has become larger (see FIG. 2)—that is, if a particle has moved vertically downward in an image—as a result of movement via a state transition model, it can be considered likely that an object is approaching imaging apparatus 200.

Therefore, for example, feature calculation section 340 stores beforehand a table in which an amount of movement and direction of movement in the Y-axis direction in an object image are associated with a size change ratio of an object. Then, using this table, feature calculation section 340 performs particle width and height correction so that the size of an object increases when moving toward the foreground, and decreases when moving toward the background.

Object tracking apparatus 300 may also perform particle likelihood correction based not on a proportion of overlap of individual particles with another object, but on whether or not a plurality of object positions estimated from particles overlap. In this case, object tracking apparatus 300, for example, estimates an object position without performing likelihood correction, and lowers the probability density of the vicinity of the estimated position when similarity is high even though the estimated position overlaps the position of another object.

Object tracking apparatus 300 may also increase the likelihood of a particle for which the size of an overlap area is less than a first predetermined value instead of lowering the likelihood of a particle for which the size of an overlap area is greater than or equal to the first predetermined value.

In this embodiment, a configuration has been described in which imaging apparatus 200 and object tracking apparatus 300 are separate, but a configuration may also be used in which imaging apparatus 200 and object tracking apparatus 300 are integrally combined.

In this embodiment, an example has been described in which the present invention is applied to a system that tracks the movements of a plurality of workers wearing the same work clothing in a factory in captured video, but application of the present invention is not limited to this. The present invention can be applied to a variety of other apparatuses and systems that track an object from video.

The disclosure of Japanese Patent Application No. 2010-34849, filed on Feb. 19, 2010, including the specification, drawings and abstract, is incorporated herein by reference in its entirety.

INDUSTRIAL APPLICABILITY

An object tracking apparatus, object tracking method, and object tracking program according to the present invention are suitable for use as an object tracking apparatus, object tracking method, and object tracking program that enable the possibility of erroneous tracking to be further reduced.

REFERENCE SIGNS LIST

100 Object tracking system
200 Imaging apparatus
300 Object tracking apparatus
310 Image acquisition section
320 Image storage section
330 Tracking command section
340 Feature calculation section
350 Likelihood calculation section
360 Position estimation section
370 Position storage section
380 Overlap proportion calculation section
390 Likelihood correction section
400 Display apparatus

The invention claimed is:

1. An object tracking apparatus that tracks a position of an object displayed in video using a particle filter, the position of the object being defined by an area corresponding to an image area of the object in the video and the object tracking apparatus comprising:
  a feature calculation section that generates a plurality of particles indicating candidates for a position of the object, and calculates a feature of an image of the object and features of images of the particles;
  a likelihood calculation section that calculates, for each particle, a likelihood of that particle being a position of the object from similarity between a feature of an image of that particle and a feature of an image of the object;
  a position estimation section that estimates a position of the object based on the calculated particle likelihood;
  an overlap proportion calculation section that calculates a size of an overlap area of a particle of a second object with respect to a position of a first object; and
  a likelihood correction section that, when there is a particle for which a size of the overlap area is greater than or equal to a first predetermined value and the likelihood is greater than or equal to a second predetermined value, corrects a likelihood of a corresponding particle.

2. The object tracking apparatus according to claim 1, wherein a position of the first object is defined by a rectangular area that circumscribes an image area of the first object in the video, and a size of the overlap area is a proportion of an area of an overlap area with respect to an area of a particle of the second object.

3. The object tracking apparatus according to claim 1, wherein the similarity is similarity between a color histogram of an image of the object and a color histogram of an image of the particle.

4. The object tracking apparatus according to claim 1, wherein the second predetermined value is an average value of particle likelihood of the second object.

5. The object tracking apparatus according to claim 1, wherein the second predetermined value is a mode of a particle likelihood histogram of the second object.

6. The object tracking apparatus according to claim 1, wherein the likelihood correction section corrects the likelihood by a size according to a difference of a size of the overlap area and a predetermined value of the likelihood.

7. An object tracking method that tracks a position of an object displayed in video using a particle filter, the position of the object being defined by an area corresponding to an image area of the object in the video and the object tracking method comprising the steps of:

generating a plurality of particles indicating candidates for a position of the object, and calculating a feature of an image of the object and features of images of the particles;

calculating, for each particle, a likelihood of that particle being a position of the object from similarity between a feature of an image of that particle and a feature of an image of the object;

estimating a position of the object based on calculated the particle likelihood;

calculating a size of an overlap area of a particle of a second object with respect to a position of a first object; and correcting, when there is a particle for which a size of the overlap area is greater than or equal to a first predetermined value and the likelihood is greater than or equal to a second predetermined value, a likelihood of a corresponding particle.

8. An object tracking program stored on a non-transitory computer medium for tracking a position of an object displayed in video using a particle filter, the position of the object being defined by an area corresponding to an image area of the object in the video and the object tracking program causing a computer to execute:

processing that generates a plurality of particles indicating candidates for a position of the object, and calculates a feature of an image of the object and features of images of the particles;

processing that calculates, for each particle, a likelihood of that particle being a position of the object from similarity between a feature of an image of that particle and a feature of an image of the object;

processing that estimates a position of the object based on calculated the particle likelihood;

processing that calculates a size of an overlap area of a particle of a second object with respect to a position of a first object; and processing that corrects, when there is a particle for which a size of the overlap area is greater than or equal to a first predetermined value and the likelihood is greater than or equal to a second predetermined value a likelihood of a corresponding particle.

* * * * *